United States Patent [19]

Suzuki et al.

[11] 4,268,430

[45] May 19, 1981

[54] FERRITE COMPOSITION HAVING HIGHER INITIAL PERMEABILITY AND PROCESS FOR PREPARING MOLDING PRODUCT THEREFROM

[75] Inventors: Kazuo Suzuki; Kenichi Yokota, both of Otsu, Japan

[73] Assignee: Kanegafuchi Kagaku Kogyo Kabushiki Kaisha, Osaka, Japan

[21] Appl. No.: 115,702

[22] Filed: Jan. 28, 1980

[30] Foreign Application Priority Data

Jan. 31, 1979 [JP] Japan ................................. 54-10620

[51] Int. Cl.³ .............................................. C08L 81/00
[52] U.S. Cl. .................................................. 260/37 R
[58] Field of Search ...................................... 260/37 R

[56] References Cited

U.S. PATENT DOCUMENTS

| | | | |
|---|---|---|---|
| 3,884,873 | 5/1975 | Short | 260/37 R |
| 3,988,286 | 10/1976 | Edmonds et al. | 260/37 R |
| 4,012,539 | 3/1977 | Davies | 260/37 R |

FOREIGN PATENT DOCUMENTS

48-51295  7/1973  Japan.

*Primary Examiner*—Lewis T. Jacobs
*Attorney, Agent, or Firm*—Armstrong, Nikaido, Marmelstein & Kubovcik

[57] ABSTRACT

A ferrite composition containing a spinel ferrite and a small amount of a polyphenylene sulfide as a binder, which can provide a molding product having a higher initial permeability and excellent thermal, flame and arc resistances. The molding product is prepared by molding the composition at an elevated temperature under pressure. The use of a ferrite mixture of particle groups having different particle size distributions within the particle size range of $100\mu$ to 5 mm. is preferred.

7 Claims, 2 Drawing Figures

FERRITE COMPOSITION HAVING HIGHER INITIAL PERMEABILITY AND PROCESS FOR PREPARING MOLDING PRODUCT THEREFROM

BACKGROUND OF THE INVENTION

The present invention relates to a ferrite composition having a higher initial permeability and a process for preparing a molding product therefrom. More particularly, the invention relates to a ferrite composition for a higher initial permeability material having excellent thermal and flame resistances in which a spinel ferrite having a specific particle size is bonded by polyphenylene sulfide as a matrix, and also to a process for preparing a molding product from the ferrite composition.

The term "higher initial permeability" as used herein means that the composition of the present invention has a higher initial permeability than that of a conventional composition of ferrite bound with a resin binder.

Hitherto, sintered compacts of spinel ferrite have been widely employed as ferrite cores, but they have many defects. For instance, these sintered compacts are poor in impact resistance and accordingly are frangible, and also are poor in dimensional stability, since dimensional scattering is caused by shrinkage upon sintering. In order to improve such defects, it has been proposed to employ high polymers as binders for ferrite powder. However, such ferrite cores have no sufficient thermal, flame and arc resistances, and have not yet been put into practical use.

SUMMARY OF THE INVENTION

Accordingly, it is an object of the present invention to provide a ferrite composition useful for providing a material having a higher initial permeability.

A further object of the invention is to provide a ferrite composition capable of providing a higher initial permeability material having excellent impact resistance and dimensional stability and moreover having excellent thermal and flame resistances.

Another object of the invention is to provide a process for preparing a molding product from the ferrite composition.

These and other objects of the invention will become apparent from the description hereinafter.

In accordance with the present invention, there is provided a composition consisting essentially of 92% to 99% by weight of a spinel ferrite and 8% to 1% by weight of a polyphenylene sulfide.

A molding product having a higher initial permeability and excellent thermal and flame resistances is prepared from the composition by molding the composition at a temperature within the melting range of polyphenylene sulfide under pressure.

DETAILED DESCRIPTION

Ferrite powders having spinel structure such as manganese-zinc ferrite and manganese-magnesium ferrite are employed as the spinel ferrite in the present invention, which are those obtained by sintering a mixture of a metal oxide and an iron oxide at a temperature of 1,000° to 1,300° C., and then pulverizing the resulting solid solution.

Polyphenylene sulfide is employed as a high polymer binder in the present invention in order to satisfy both the thermal resistance and the flame resistance required in using the molding product obtained from the composition of the invention. Finely divided polyphenylene sulfide is suitably employed. The particle size of the polyphenylene sulfide is desirable to be as small as possible, and the polyphenylene sulfide having a particle size of not more than 300μ, particularly of not more than 100μ, is preferably employed in the invention, since it is necessary that polyphenylene sulfide has a particle size such that it is well dispersed with ferrite and since the amount of polyphenylene sulfide used is small. Also, it is preferable to employ polyphenylene sulfide having a viscosity (measured by a melt index method) of 20 to 400 g./minute. Polyphenylene sulfide is a thermoplastic resin having a simple and stable structure

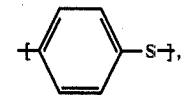

a thermal resistance of 200° to 250° C., self-extinguishing property (structural flame resistance) and a melting point of 288° C.

In case of binding the spinel ferrite with a resin, it is necessary to make the distance between the ferrite particles short and also to make the particle size of the ferrite particles large as much as possible in order to smoothen the propagation of the wave caused by vibration of magnetic wall so as to obtain a larger magnetic permeability. Therefore, it is desirable to make the ferrite content of the composition large as much as possible within the range of causing no problem in strengths of the molding product obtained from the composition, and also to use ferrite having as large particle size as possible if nothing interferes in practical use.

Figure 1:
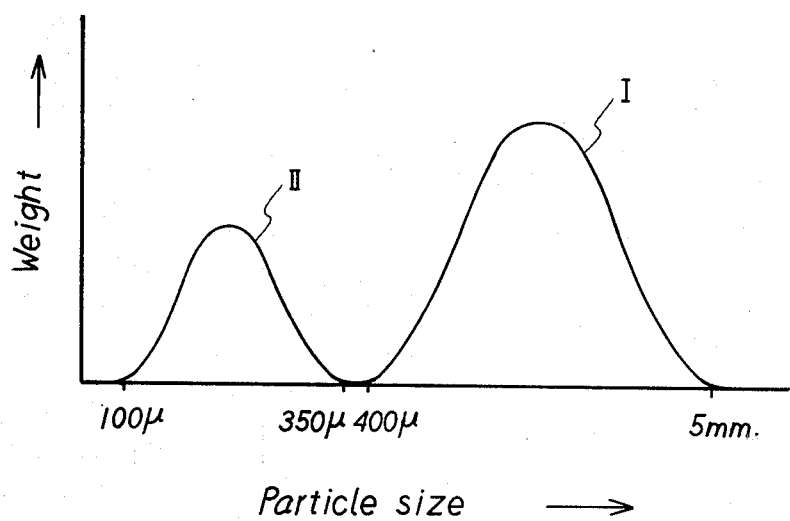
FIG. 1 is a graph showing a particle size distribution of a ferrite particle employed in the present invention.

It is important to pay attention to the selection of the ferrite particle so that the distance between the particles becomes short as much as possible and so as to permit the closest packing. For this purpose, the particle size distribution of the ferrite is important. In the present invention, there is employed as the ferrite a mixture of ferrite particle groups having different particle size distributions within the particle size range of 100μ to 5 mm. In particular, there is employed a mixed spinel ferrite which has a particle size within the range of 100μ to 5 mm. and consists of 90% to 20% by weight of a large particle group having a particle size within the range of 400μ to 5 mm. and 10% to 80% by weight of a small particle group having a particle size within the range of 100μ to 350μ. As shown in FIG. 1, the mixed ferrite particle has two peaks of a particle size distribution curve (I) formed by the large particle group and a particle size distribution curve (II) formed by the small particle group. The desirable spinel ferrite particle employed in the present invention is a mixture consisting of a large particle group having a particle size of 400μ to 5 mm., preferably 850μ to 5 mm. and a small particle group having a particle size of 100μ to 350μ, in a ratio of 90:10 to 20:80, preferably 70:30 to 80:20 by weight.

Figure 2:
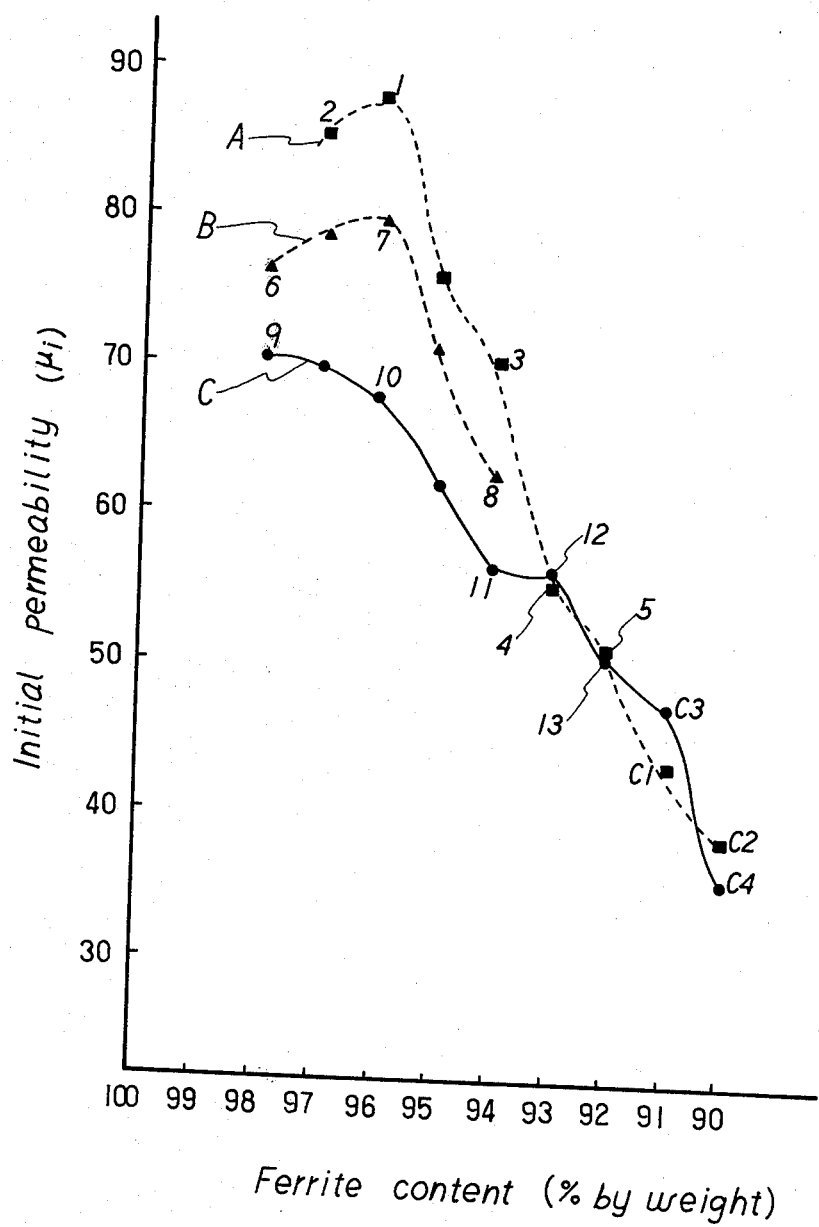
FIG. 2 is a graph showing the relationship between the initial permeability of a molding product of ferrite bound with polyphenylene sulfide and the ferrite content of the molding product.

When a molding product is prepared from the composition of the specific mixed spinel ferrite particle and polyphenylene sulfide, there is obtained a molding product having a higher initial permeability which is excellent in both the thermal resistance of 200° to 250° C. and the flame resistance. One instance of the initial permeability of the molding products obtained from the compositions of the invention is shown in FIG. 2. FIG. 2 is a graph showing the relationship between the initial permeability ($\mu i$) of a molding product of ferrite bound with polyphenylene sulfide and the ferrite content of the molding product with respect to each particle size distribution of ferrite, in which the numerals show Example Nos. and the numerals marked with the character "C" show Comparative Example Nos. With respect to molding products (A) containing the ferrite particle having a particle size distribution of 4 mm. to 2.8 mm. and the ferrite particle having a particle size distribution of 350$\mu$ to 100$\mu$ in a ratio of 70:30 by weight and molding products (B) containing the ferrite particle having a particle size distribution of 2.4 mm. to 1.4 mm. and the ferrite particle having a particle size distribution of 350$\mu$ to 100$\mu$, the molding products show the maximum initial permeability when the ferrite content is 96% by weight, and the initial permeability decreases with increase and decrease of the ferrite content as to this point. In particular, when the content is decreased, a sudden decrease of the initial permeability is observed. With respect to molding products (C) containing the ferrite particle having a particle size distribution of 1.0 mm. to 850$\mu$ and the ferrite particle having a particle size distribution of 350$\mu$ to 100$\mu$, the molding products show the maximum initial permeability when the ferrite content is 98% by weight, and a sudden decrease of the initial permeability is observed with decrease of the ferrite content.

A mixture of 92% to 99% by weight of the spinel ferrite particle and 8% to 1% by weight of polyphenylene sulfide is preferably employed in the present invention. When the content of polyphenylene sulfide is less than 1% by weight, the effect as a binder is weak and the strengths of the obtained molding product is lowered. When the content of polyphenylene sulfide is more than 8% by weight, the molding product having a higher initial permeability is not obtained.

The ferrite particle and polyphenylene sulfide are blended in a usual manner, and all usual blending methods are adoptable.

Although the injection molding and the transfer molding are adoptable, the composition of the present invention is usually molded by means of a hot press molding, since the ferrite having a large particle size is blended with the polyphenylene sulfide powder in a high ferrite content. The molding temperature is selected from the melting range of the polyphenylene sulfide which is not less than the melting point of polyphenylene sulfide and is not more than the decomposition temperature of polyphenylene sulfide, and is preferably selected from the range of 290° to 320° C. It is desirable to select an optimum molding pressure capable of permitting the closest packing whithin the range of exerting no effect on the ferrite particle, and the molding pressure is selected from 2 to 6 tons/cm²., preferably 2 to 4 tons/cm².

The preferred compositions of the present invention are those obtained by blending (1) 1% to 8%, preferably 2% to 6%, more preferably 3% to 5% by weight of a finely divided polyphenylene sulfide and (2) 99% to 92%, preferably 98% to 94%, more preferably 97% to 95% by weight of a spinel ferrite mixture (e.g. manganese-zinc type and manganese-magnesium type) of the ferrite particles having different particle size distributions of 5 mm. to 400$\mu$ and 350$\mu$ to 100$\mu$, preferably 5 mm. to 850$\mu$ and 350$\mu$ to 100$\mu$ in a ratio of 20:80 to 90:10, preferably 60:40 to 90:10, more preferably 70:30 to 80:20 by weight. The preferred process for preparing a molding product having a higher initial permeability is a hot press molding in which the composition of the invention is molded at a temperature within the melting range of polyphenylene sulfide, preferably at a temperature of 290° to 320° C. under a pressure of 2 to 6 tons/cm²., preferably 2 to 4 tons/cm².

According to the present invention, it is possible to obtain an article which has a good accuracy in dimensions, even though the shape is complicated, directly by molding the ferrite composition under pressure, and there is no necessity for conducting a secondary processing as required after sintering in a conventional sintered compact to increase the accuracy in dimensions.

The compositions and the molding products prepared therefrom of the present invention are usable as a deflecting yoke core for black-and-white and color televisions, an armature of a generator for bicycles and an armature of a DC motor. It is possible to design a molding product of a complicated shape which has not been attained, with a good dimensional accuracy.

The present invention is more particularly described and explained by means of the following Examples, in which all % and ratios are by weight unless otherwise noted.

EXAMPLES 1 TO 25 AND COMPARATIVE EXAMPLES 1 TO 5

Sintered manganese-zinc ferrite having an initial permeability of 1,000 to 3,000 was pulverized into particle, and the ferrite particle having a particle size within the range of 4.0 mm. to 2.8 mm. and the ferrite particle having a particle size within the range of 350$\mu$ to 100$\mu$ were mixed in a ratio of 70:30. The ferrite mixture was blended with a finely divided polyphenylene sulfide (commercially available under the trade name of "Ryton P-4" or "Ryton P-3" made by Phillips Petroleum Co.) to give a composition containing 4.0% of the polyphenylene sulfide. The composition was hot-pressed at a temperature of 290° to 320° C. by adding a pressure of 3 tons/cm². The initial permeability of the obtained molding product was 87.0, which was measured at a frequency of 1 kHz at room temperature (Example 1).

The procedures of Example 1 were repeated except that the content of the polyphenylene sulfide was varied (Examples 2 to 5 and Comparative Examples 1 and 2).

The procedures of Example 1 were repeated except that a ferrite mixture of the ferrite particle having a particle size of 2.4 mm. to 1.4 mm. and the ferrite particle having a particle size of 350$\mu$ to 100$\mu$ in a ratio of 70:30 was employed and a composition consisting of the ferrite mixture and 2.0, 4.0 or 6.0% of the polyphenylene sulfide was prepared (Examples 6 to 8).

The procedures of Example 1 were repeated except that a ferrite mixture of the ferrite particle having a particle size of 1.0 mm. to 850$\mu$ and the ferrite particle having a particle size of 350$\mu$ to 100$\mu$ was employed and a composition consisting of the ferrite mixture and 2, 4, 6, 8, 9 or 10% of the polyphenylene sulfide was prepared (Examples 9 to 13 and Comparative Examples 3 and 4).

The procedures of Example 1 were repeated except that ferrite mixtures of the ferrite particle having a particle size of 2.4 mm. to 1.4 mm. or 4.0 mm. to 2.8 mm. and the ferrite particle having a particle size of 350μ to 100μ in varied ratios were employed (Examples 14 to 19).

The procedures of Example 1 were repeated except that a composition consisting of a ferrite mixture of the ferrite particle having a particle size of 2.4 mm. to 1.4 mm. and the ferrite particle having a particle size of 350μ to 100μ in a ratio of 70:30 and 4.0% of the polyphenylene sulfide was pressed under a pressure of 2, 3, 4 or 5 tons/cm². (Examples 20 to 23).

The procedures of Example 1 were repeated except that a ferrite mixture of the ferrite particle having a particle size of 600μ to 350μ and the ferrite particle having a particle size of 350μ to 100μ in a ratio of 70:30 was employed (Example 24), or only the ferrite particle having a particle size of 350μ to 100μ was employed (Comparative Example 5).

The procedure of Example 1 was repeated except that a manganese-magnesium ferrite was employed instead of the manganese-zinc ferrite (Example 25).

The ferrite content of the composition, mixing ratio of ferrite particles, molding pressure and initial permeability of the obtained molding product are shown in the following Table.

What we claim is:

1. A composition consisting essentially of 92% to 99% by weight of a spinel ferrite and 8% to 1% by weight of a polyphenylene sulfide.

2. The composition of claim 1, wherein said spinel ferrite is a mixture of particle groups having different particle size distributions within the particle size range of 100μ to 5 mm.

3. The composition of claim 2, wherein said spinel ferrite is a mixture of a large particle group having a particle size of 400μ to 5 mm. and a small particle group having a particle size of 100μ to 350μ.

4. The composition of claim 3, wherein the ratio of the large particle group to the small particle group is from 90:10 to 20:80 by weight.

5. A process for preparing a molding product from a ferrite composition which comprises molding a composition consisting essentially of 92% to 99% by weight of a spinel ferrite and 8% to 1% by weight of a polyphenylene sulfide at a temperature within the melting range of the polyphenylene sulfide under pressure.

6. The process of claim 5, wherein the molding is carried out by a hot press molding at a temperature of 290° to 320° C. under a pressure of 2 of 6 tons/cm².

7. The process of claims 5 or 6, wherein said spinel ferrite is a mixture of a large ferrite particle group having a particle size of 400μ to 5 mm. and a small ferrite particle group having a particle size of 100μ to 350μ in a ratio of 90:10 to 20:80 by weight.

* * * * *

|  | Ferrite content (%) | Mixing ratio of ferrite particles | | Molding pressure (ton/cm².) | Initial permeability (μᵢ) |
| --- | --- | --- | --- | --- | --- |
|  |  | Particle size | Weight ratio |  |  |
| Ex. 1 | 96 | 4.0–2.8 mm. : 350–100 μ | 70:30 | 3 | 87.4 |
| Ex. 2 | 97 | " | " | " | 84.7 |
| Ex. 3 | 94 | " | " | " | 70.1 |
| Ex. 4 | 93 | " | " | " | 54.7 |
| Ex. 5 | 92 | " | " | " | 50.5 |
| Com. Ex. 1 | 91 | " | " | " | 42.4 |
| Com. Ex. 1 | 90 | " | " | " | 40.0 |
| Ex. 6 | 98 | 2.4–1.4 mm. : 350–100 μ | 70:30 | 3 | 75.9 |
| Ex. 7 | 96 | " | " | " | 79.6 |
| Ex. 8 | 94 | : | " | " | 62.3 |
| Ex. 9 | 98 | 1.0 mm.–850 μ : 350–100 μ | 70:30 | 3 | 70.1 |
| Ex. 10 | 96 | " | " | " | 67.7 |
| Ex. 11 | 94 | " | " | " | 56.1 |
| Ex. 12 | 93 | " | " | " | 55.7 |
| Ex. 13 | 92 | " | " | " | 50.2 |
| Com. Ex. 3 | 91 | " | " | " | 46.8 |
| Com. Ex. 4 | 90 | " | " | " | 35.2 |
| Ex. 14 | 96 | 2.4–1.4 mm. : 350–100 μ | 80:20 | 3 | 76.8 |
| Ex. 15 | 96 | 4.0–2.8 mm. : 350–100 μ | 60:40 | " | 82.4 |
| Ex. 16 | " | " | 50:50 | " | 75.6 |
| Ex. 17 | " | " | 40:60 | " | 72.3 |
| Ex. 18 | " | " | 30:70 | " | 68.8 |
| Ex. 19 | " | " | 20:80 | " | 64.4 |
| Ex. 20 | 96 | 2.4–1.4 mm. : 350–100 μ | 70:30 | 2 | 81.8 |
| Ex. 21 | " | " | " | 3 | 82.6 |
| Ex. 22 | " | " | " | 4 | 79.9 |
| Ex. 23 | " | " | " | 5 | 79.1 |
| Ex. 24 | 96 | 600–350 μ : 350–100 μ | 70:30 | 3 | 59.0 |
| Com. Ex. 5 | 96 | 350–100 μ | 100 | 3 | 48.1 |
| Ex. 25 | 96 | 2.4–1.4 mm. : 350–100 μ | 70:30 | 3 | 65.1 |